United States Patent [19]
Spain et al.

[11] 3,769,742
[45] Nov. 6, 1973

[54] MOUSE TRAP

[76] Inventors: Theodore H. Spain, 885 Prairie Ave., Des Plaines; Allen F. J. Geimer, 1701 Richard W. Dr., Glenview; Victor E. Loesche, Jr., 3402 Elaine Ave., Park City, all of Ill.

[22] Filed: June 2, 1972

[21] Appl. No.: 259,138

[52] U.S. Cl. ................................. 43/81, 43/81.5
[51] Int. Cl. ........................................ A01m 23/00
[58] Field of Search ............................. 43/81, 81.5

[56] References Cited
UNITED STATES PATENTS
2,741,064 4/1956 Patch ................................... 43/81
2,052,345 8/1936 Garling ................................ 43/81

Primary Examiner—Louis G. Mancene
Assistant Examiner—Robert F. Cutting
Attorney—Benjamin Schlosser

[57] ABSTRACT

A mouse trap is provided with a finger operable release lever for lifting the striking bar from a dead mouse that has been caught in a trap, so that a person emptying the trap does not touch the mouse, and with a plastic bag to receive the dead mouse. The plastic bag is positioned to protect the trap against contamination when a mouse is killed by the striking bar. A second plastic bag may be mounted on the striking bar to prevent contamination of the bar.

3 Claims, 6 Drawing Figures

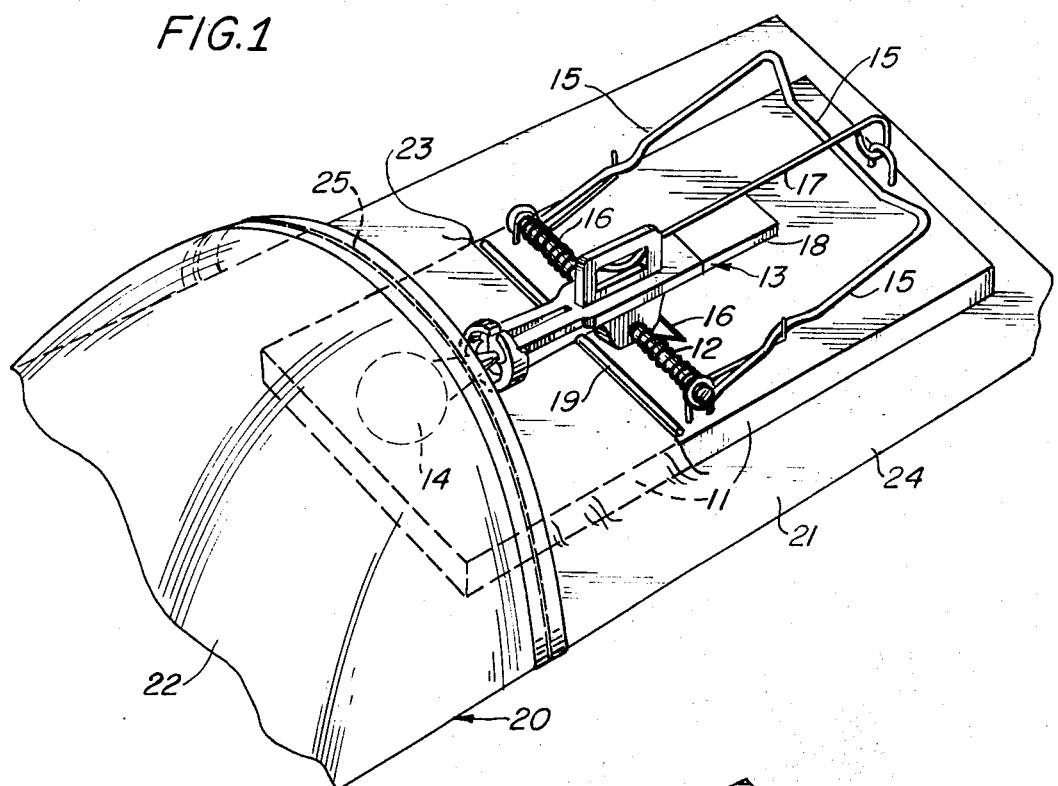
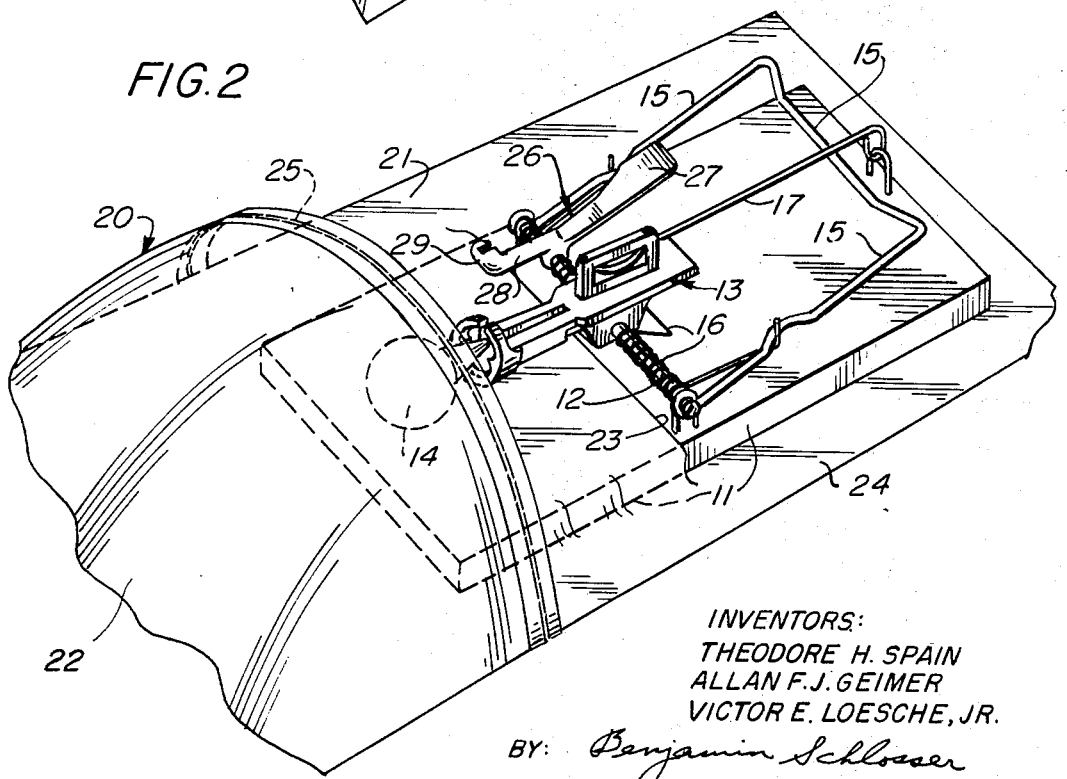

INVENTORS:
THEODORE H. SPAIN
ALLAN F. J. GEIMER
VICTOR E. LOESCHE, JR.

BY Benjamin Schlosser
ATTORNEY

MOUSE TRAP

BACKGROUND OF THE INVENTION

1. Field of the Invention

The present invention is concerned with a trap for catching and killing mice, with particular reference to means permitting removal of a dead mouse from the trap without contamination of either the trap or the fingers of the person emptying the trap.

2. Description of the Prior Art

Prior to the present invention mouse traps were often contaminated by the blood and fragments of the flesh of a mouse killed by the striking bar, and the striking bar had to be lifted from the dead mouse by a person's fingers. It was often impossible to remove a dead mouse from the trap without the fingers touching the mouse.

SUMMARY OF THE INVENTION

This invention relates to a mouse trap, and is particularly concerned with preventing contamination of the trap when a mouse is killed by the striking bar and enabling a person to remove a dead mouse from the trap without touching the mouse.

BRIEF DESCRIPTION OF THE DRAWING

FIG. 1 is a fragmentary perspective view of a preferred embodiment of the invention, with the striking bar in ready position;

FIG. 2 is a view, similar to FIG. 1, showing another embodiment of the invention;

DESCRIPTION OF THE PREFERRED EMBODIMENTS

Figure 3:
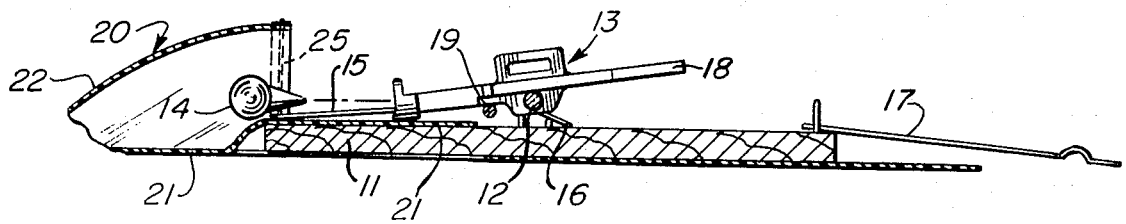
FIG. 3 is a longitudinal sectional view of the structure of FIG. 1 when the striking bar has been released from its ready position.

As shown in the drawings, the mouse trap with which the invention is concerned comprises a flat base 11 of wood or any other suitable material having a transversely extending rod 12 centrally mounted above the upper surface of the base. The front end of a bait holding member 13 is adapted to releasably hold the biat 14. A striking bar 15 pivotally secured to the rod 12 is urged toward the top surface of the base 11 adjacent its front end by a spring 16 and is held against the action of the spring by a latch 17. Any slight force exerted against the front end of the bait holding member, such as that caused by a mouse moving into contact with the bait, is sufficient to displace the latch from the bait holding member and thus to cause the spring to move the striking bar pivotally toward the mouse with sufficient force to kill it. Such killing usually causes the front portion of the trap to be contaminated by the mouse's blood and small fragments of its flesh. It is difficult to remove a dead mouse from the trap without touching it.

Figure 4:
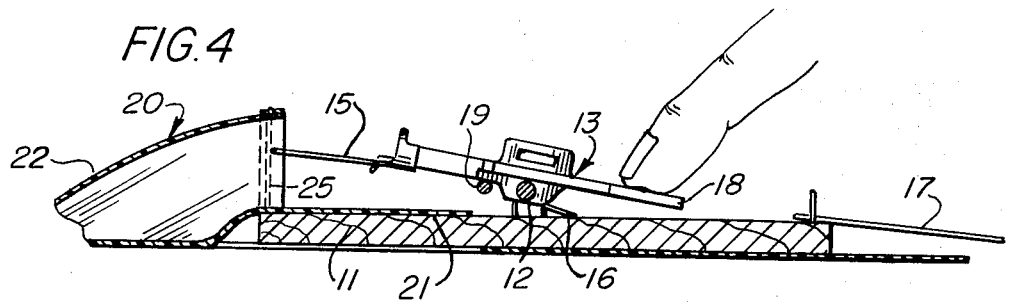
FIG. 4 is a view similar to FIG. 3 with the striking bar lifted from mouse engaging position.

In the embodiment of the invention shown in FIGS. 1, 3 and 4 of the drawing, an extension 18 projecting rearwardly from the bait holding member 13 forms a lever that may be operated by finger pressure to lift the front end of the bait holding member. A second rod 19 rigidly secured to the bait holding member forwardly of the rod 12 extends transversely of the base 11 in a horizontal plane below the rod 12. The opposite ends of the rod 19 extend under the striking bar when the striking bar is in its mouse engaging position so that the rod 19 lifts the striking arm from its mouse engaging position when the extension 18 is pressed downwardly.

The structure for preventing contamination of the front end of the base 11 when a mouse is killed comprises a plastic bag 20 having its bottom wall 21 considerably longer than its upper wall 22. The bottom wall 21 is provided with a transverse slot 23 intermediate the length of the portion 24 of the bottom wall extending longitudinally beyond the open end of the plastic bag. The front portion of the base 11 is inserted through the slot so that the front portion of the base is positioned below the bottom wall 21, and the rear portion of the base is seated on top of the bottom wall.

The free end of the upper wall 22 is spaced forwardly of the bait 14 and is held in distended position by an arcuately curved wire 25 secured to the free edge of the top wall in any suitable manner. A conventional pipe cleaner may be bent in the proper shape and held in place by friction to serve as the wire 25. When the striking bar strikes a mouse moving into contact with the bait, the bottom wall of the plastic bag protects the front portion of the base 11 from contamination. The rear end of the trap is then tilted upwardly while the plastic bag is held in place, and release of the striking bar allows the dead mouse to drop in to the open end of the plastic bag. The striking bar may also be protected against contamination by a second plastic bag (not shown) that may be slipped over the outer end portion of the striking bar.

Figure 5:
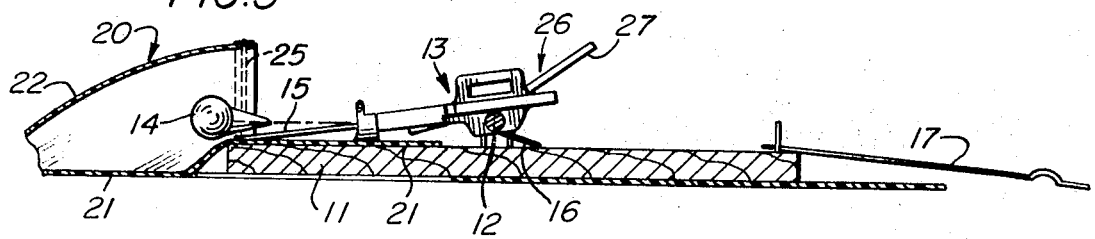
FIG. 5 is a view similar to FIG. 3, but showing the structure of FIG. 2.
Figure 6:
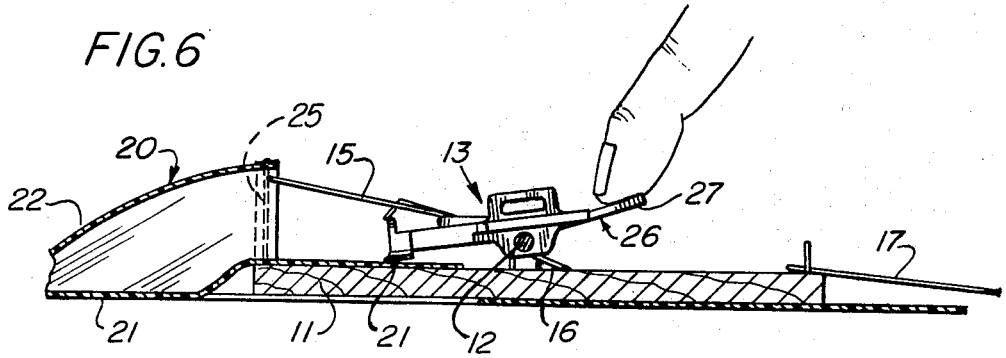
FIG. 6 is a view similar to FIG. 4, but showing the structure of FIG. 2.

Much of the structure of the embodiment of the invention disclosed in FIGS. 2, 5 and 6 is identical to that disclosed in FIGS. 1, 3 and 4, and is designated by the same reference numerals. The description of such structure will not be repeated.

In FIGS. 2, 5 and 6, a lever 26 is pivotally mounted on the rod 12 with a finger operable trigger 27 extending rearwardly of the rod 12. The opposite end 28 of the lever has a finger 29 extending laterally to engage the underside of one of the arms 20 of the striking bar when the striking bar is in mouse engaging position and pressure is applied against the trigger to move it toward the upper surface of the rear portion of the base 11. The finger 29 moves the striking bar against the action of the spring 16 far enough to permit removal of a mouse caught by the trap.

We claim:

1. A mouse trap comprising a base, a striking bar, spring means urging said striking bar into engagement with a mouse on the top surface of the front portion of said base, a plastic bag mounted on the front portion of said base in position to prevent contamination of said base by a mouse caught between said striking bar and base, and a lever operable by finger pressure to move said striking bar out of said mouse engaging position against the action of said spring.

2. A mouse trap as recited in claim 1, in which said bag is dimensioned to receive and hold a mouse caught between said striking bar and said base when said striking bar is moved out of said mouse engaging position.

3. A mouse trap as recited in claim 2, in which said plastic bag has an open end positioned adjacent the mouse engaging position of said striking bar, and means holding said open end in distended position.

* * * * *